Jan. 8, 1924.  1,480,120

H. SCHOLL

RIM CONTRACTOR

Filed Jan. 5, 1923  2 Sheets-Sheet 1

Inventor
Howard Scholl.

By

Attorney

Jan. 8, 1924.

H. SCHOLL 1,480,120

RIM CONTRACTOR

Filed Jan. 5, 1923

Inventor
Howard Scholl.

By

Attorney

Patented Jan. 8, 1924.

1,480,120

UNITED STATES PATENT OFFICE.

HOWARD SCHOLL, OF MILLERSTOWN, PENNSYLVANIA.

RIM CONTRACTOR.

Application filed January 5, 1923. Serial No. 610,789.

*To all whom it may concern:*

Be it known that I, HOWARD SCHOLL, a citizen of the United States, residing at Millerstown, in the county of Perry, State of Pennsylvania, have invented certain new and useful Improvements in Rim Contractors; and I do hereby declare the following to be a full, clear, and exact description of the invention, such as will enable others skilled in the art to which it appertains to make and use the same.

This invention relates to new and useful improvements in automobile tools and particularly to tools adapted to compress or contract the rims of automobile wheels to render easy the removal of the tires.

One object of the invention is to provide a novel and simple device by means of which the rim may be flexed to properly slip the ends thereof past each other, and thereby permit the more easy and quick removal of the tire from the rim.

Another object is to provide a device of this character which will firmly and tightly grip the ends of the rim, and draw the same past each other, without damage to the rim or tire.

Another object is to provide a device of this character which can be easily and quickly released from its gripping and contracting position.

Other objects and advantages will be apparent from the following description when taken in connection with the accompanying drawing.

Figure 1:
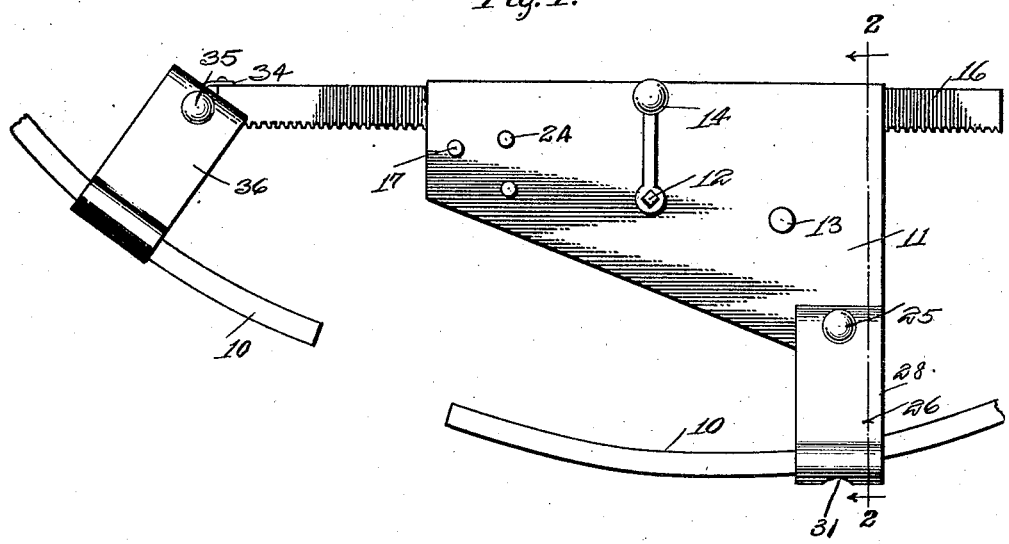
Figure 1 is an elevation of the rim contracting tool in position on the rim of a wheel.
Figure 4:
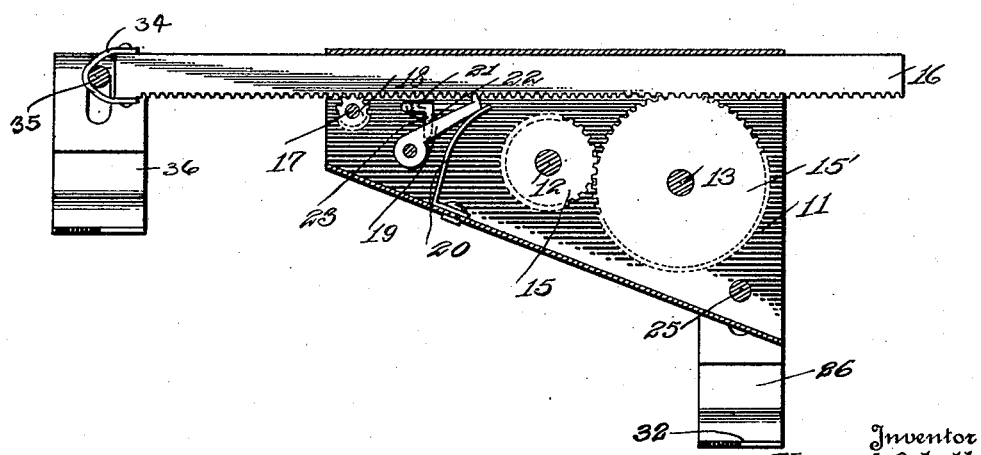
Figure 4 is a vertical longitudinal sectional view through the device, on the line 4—4 of Figure 3.
Figure 3:
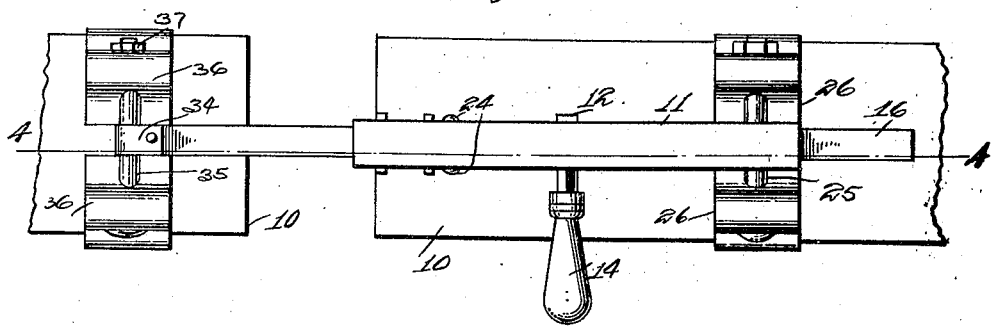
Figure 3 is a top plan view of the device.
Figure 2:
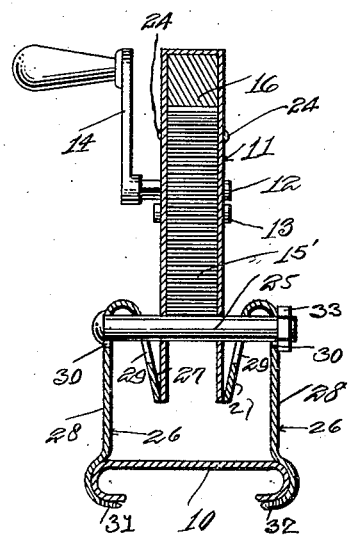
Figure 2 is an enlarged vertical sectional view on the line 2—2 of Figure 1, showing the clamps, properly engaged with the rim.

Referring particularly to the accompanying drawing, 10 represents the ends of the tire carrying rim of an automobile wheel, in connection with which the present invention is adapted for use.

As clearly seen in the drawing, 11 shows a longitudinally tapered and open-ended casing, in which are mounted the transverse shafts 12 and 13. The former of these shafts projects a short distance beyond one side of the casing and is angular in cross section to receive thereon the crank handle 14. On the shaft 12 is a small gear 15, and on the shaft 13 is a larger gear 15', the former meshing with the latter, and the latter meshing with the rack bar 16, which is disposed within the upper portion of the casing 11, and arranged to slide longitudinally therein. At the smaller end of the casing is a transverse shaft 17, and idly rotatable on this shaft, within the casing, and meshing with the rack bar 16, is a small gear 18, the same serving as a guide and support for the rack bar, so that the bar will be held against the upper wall of the casing. Pivotally mounted within the casing, adjacent the smaller end thereof, is a pawl 19, the nose of which engages with the teeth of the rack bar 16, while a leaf spring 20 is secured to the lower wall of the casing and bears against the pawl to hold the same properly engaged with the teeth of the rack bar. Formed in the opposite side walls of the casing, between the pawl and the rack bar, are the aligned elongated slots 21, the inner end of each of which is formed with a depression or recess 22 in its lower wall. Disposed transversely of the casing, and within the said slots 21, is a pin 23, the ends of which have the heads 24 which bear against the outer faces of the walls of the casing, and which are adapted to be grasped to slide the pin against the pawl, and thereby release the latter from the teeth of the rack bar, with the result that the rack bar may be pulled out to the desired distance, before the tool is operated. When the pin 23 is thus pulled back it is given a slight downward push, which places it in the recesses 22, where it remains, until released, and when in such position, the bar 16 may be pulled out without the necessity of holding the pin in its innermost position.

Disposed through the lower portion of the larger end of the casing 11 is a shaft bolt 25, and engaged on each end of the bolt is a rim engaging clip 26. Each of these clips is formed from a single length of metal of the desired width and thickness, and has the two leg portions 27 and 28, the former having a longitudinal slot 29, and the latter a circular opening 30, the slot and opening being of slightly greater diameter than the bolt 25, so that there will be play of the bolt within the opening and slot. The leg 28 is longer than the leg 27 and has its outer end bent into a shape to engage with the curved side of the rim, and is also bifurcated, as shown at 31 and 32 respectively. Nuts 33 are engaged on the ends of the bolt to force the clamps into firm and tight engagement with the opposite sides of the rim.

Secured to and extending from the end of the rack bar 16, at the other or smaller end of the device, is a strap loop 34 within which is rotatably disposed the tranversely extending shaft or bolt 35, formed similarly to the bolt 25, and having in its ends clamps 36 and nuts 37, identical with the clamps or clips 26 and the nuts 33.

The manner of applying the device to the rim will be readily apparent from an inspection of the drawing. In operating the device, after the rim ends have been pried into slightly overlapping position, the crank handle 14 is grasped and turned, with the result that the motion will be imparted to the larger gear 15′ and thence to the rack bar 16, with the result that the bar will be withdrawn into the casing, and the ends of the rim drawn past each other by the clips or clamps 26 and 36. The engagement of the pawl 19 with the teeth of the rack bar 16 serves to prevent retrograde movement of the rack bar, due to the force exerted by the rim, which has a tendency to expand. The rim will thus be firmly held so that the tire may be easily and quickly taken from the rim. In fact, when the rim is so contracted, the tire will fall from the rim. This is especially valuable where the rim has rusted and the tire has become adhered thereto.

Figure 5:
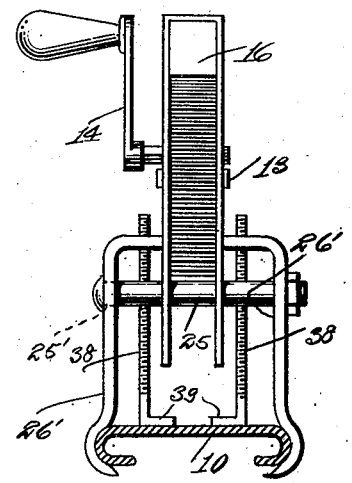
Figure 5 is a detail view of a modification of the rim clamps.

As shown in Figure 5, the clamps or clips have their upper or inner ends extended at right angles to the bodies thereof, and in the extremity of each of said angularly extending portion there is formed a threaded opening through which is disposed a threaded stem 38, the angularly extending end being designated by the numeral 39. The bolt 25 is received through an opening 25′ in the clip member 26′. The bolt 25, and the threaded stem 38 are so arranged that they readily pass each other, and the end of the stem is formed with a laterally turned foot 40 which is adapted to rest on the inner face of the rim, said stem being adjustable through the clip member 26′ to accommodate rims of different thicknesses.

What is claimed is:

1. A rim contractor comprising a casing, a rack bar slidable in the casing, a gear in the casing engaged with the rack bar, means for rotating the gear to move the rack bar in one direction, a pawl engaged with the rack bar to prevent movement thereof in the other direction, a support on one end of the rack bar, a shaft in the support, rim end engaging clips on the shaft, a shaft in the end of the casing remote from the first shaft, and rim end engaging clips on the second shaft, each of said clips having elongated openings loosely receiving the shaft.

2. In a rim contractor a support, a slidable member in the support, means for moving the slidable member longitudinally of the support, transverse bolts carried by the support and the slidable member respectively at remote ends of the contractor, and rim end engaging clips carried by the ends of the bolts and each consisting of a strip of metal bent on itself to form a pair of legs of unequal length, the longer leg being extended at an angle from the body of the leg and bifurcated and being formed with an opening of greater diameter than the bolt, the shorter leg being formed with an elongated opening of greater width than the bolt.

In testimony whereof, I affix my signature, in the presence of two witnesses.

HOWARD SCHOLL.

Witnesses:
MARY W. ULSH,
T. CLAIR KERCHNER.